US012643807B2

(12) United States Patent
Pashley et al.

(10) Patent No.: US 12,643,807 B2
(45) Date of Patent: Jun. 2, 2026

(54) PROCESSES AND SYSTEMS FOR DE-WATERING SLUDGE

(71) Applicant: NewSouth Innovations Pty Limited, Sydney (AU)

(72) Inventors: Richard Mark Pashley, Sydney (AU); Mojtaba Taseidifar, Sydney (AU); Barry Ninham, Sydney (AU); Mohammad Ziaee, Sydney (AU)

(73) Assignee: NewSouth Innovations Pty Limited, Sydney (AU)

( * ) Notice: Subject to any disclaimer, the term of this patent is extended or adjusted under 35 U.S.C. 154(b) by 654 days.

(21) Appl. No.: 18/002,000

(22) PCT Filed: Jun. 30, 2021

(86) PCT No.: PCT/AU2021/050694
§ 371 (c)(1),
(2) Date: Dec. 15, 2022

(87) PCT Pub. No.: WO2022/000034
PCT Pub. Date: Jan. 6, 2022

(65) Prior Publication Data
US 2023/0234874 A1 Jul. 27, 2023

(30) Foreign Application Priority Data

Jun. 30, 2020 (AU) ................................ 2020902214

(51) Int. Cl.
*C02F 11/13* (2019.01)
*B01D 53/26* (2006.01)
(Continued)

(52) U.S. Cl.
CPC ............ *C02F 11/13* (2019.01); *B01D 53/261* (2013.01); *B01D 61/363* (2022.08); *C02F 1/008* (2013.01);
(Continued)

(58) Field of Classification Search
None
See application file for complete search history.

(56) References Cited

U.S. PATENT DOCUMENTS 4,215,637 A * 8/1980 Lombana ................. F23G 5/38
110/225
2016/0334162 A1* 11/2016 Kim ................. H01L 21/67109

FOREIGN PATENT DOCUMENTS

CN 207351160 U 5/2018
CN 207738619 U 8/2018
(Continued)

OTHER PUBLICATIONS

"International Preliminary Report on Patentability corresponding International Application No. PCT/AU2021/050694 mailed Dec. 13, 2022".
(Continued)

*Primary Examiner* — Richard C Gurtowski
(74) *Attorney, Agent, or Firm* — Myers Bigel, P.A.

(57) ABSTRACT

Disclosed herein is a process for de-watering a sludge. The process comprises heating a de-watering fluid, and passing the de-watering fluid through the sludge, thereby de-watering the sludge. Also disclosed herein is a system for de-watering a sludge and a sludge which is at least partially de-watered according to the process.

16 Claims, 4 Drawing Sheets

(51) Int. Cl.

| | | |
|---|---|---|
| *B01D 61/36* | (2006.01) | |
| *C02F 1/00* | (2023.01) | |
| *F26B 3/08* | (2006.01) | |
| *F26B 21/25* | (2026.01) | |
| *F26B 21/33* | (2026.01) | |
| *F26B 21/35* | (2026.01) | |
| *F26B 21/40* | (2026.01) | |

(52) U.S. Cl.
    CPC .............. *F26B 3/082* (2013.01); *F26B 21/25*
        (2026.01); *F26B 21/333* (2026.01); ***F26B
        21/35* (2026.01); *F26B 21/40*** (2026.01); *C02F
        2209/02* (2013.01); *C02F 2303/18* (2013.01);
                        *F26B 2200/18* (2013.01)

(56)                 References Cited

FOREIGN PATENT DOCUMENTS

| KR | 101889896 B1 | 9/2018 |
|---|---|---|
| WO | 03050046 A1 | 6/2003 |

OTHER PUBLICATIONS

"International Search Report and Written Opinion corresponding to
International Application No. PCT/AU2021/050694 mailed Aug. 9,
2021".

* cited by examiner

PROCESSES AND SYSTEMS FOR DE-WATERING SLUDGE

TECHNICAL FIELD

This disclosure relates generally to processes and systems for de-watering sludge. However, it will be appreciated that the invention is not limited to this particular field of use.

BACKGROUND

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of the common general knowledge in the field.

The terms sludge or slime typically refer to a high-water content colloidal dispersion that stubbornly resists de-watering. De-watering is a process in which water from the sludge is separated from the solids, to thicken up the waste for disposal or further processing. De-watering is a problem that poses major economic, environmental and safety challenges for a range of sludge types in industries such as clay production, phosphate mining, diamond mining, sewage sludges, sand washing, paper mills, gold mining, and sludges from different metallic ores. As an example, phosphate mining produces clay tailing slurries or sludges which are usually less than 10% solid content, but they must be de-watered to a value of at least 40% by an economically acceptable process prior to disposal or further processing. Sludges often have a solid content with an average particle size equal to or less than 50 microns. This is generally a characteristic of suspensions of siliceous and clay solids, and for other minerals, depending on the industrial process.

Different techniques to de-water sludges are employed in different industries. Techniques include coagulation, flocculation, grinding, heating, applying high voltages and using hydrocyclones. However, these techniques require vast amounts of energy and have also failed to provide desirable solid content levels high enough to be economically sensible. For instance, flocculation methods need high levels of flocculating agents, which becomes a concern for environmental, economic and safety reasons.

Conventional methods, for example ponding, also suffer from disadvantages as they require large acreages of land to effectively de-water large volumes of sludge slurries. This also increases land maintenance and remediation costs and may also cause environmental and health issues.

Hydrocyclones are frequently used in different industries for de-watering of solid-liquid suspensions. Generally, large hydrocyclones are used with sludge (i.e. waste) with fine particles (>25 μm), while small hydrocyclones are used to separate fine particles at <10 μm. However, the use of hydrocyclones limits the controllability of de-watering, which leads to less efficiency, with outputs usually needing further processing, like centrifugation, to obtain an as high as possible de-watering level.

Hydrocyclones, in general, have an inlet, a main body and two outlets. To increase the recovery of solids, a feed pressure in the inlet needs to be increased. Other conditions such as relationship between cut size, bypass and water recovery also determine the performance of hydrocyclones.

Thus, depending on the waste type, hydrocyclones need to be optimised in order to obtain maximum de-watering efficiency.

It is an object of the present invention to overcome or ameliorate one or more the disadvantages of the prior art, or at least to provide a useful alternative.

SUMMARY

Disclosed is a process for de-watering a sludge. The term "sludge" as used herein also includes fines, slimes, suspensions and colloidal dispersions that resist de-watering and that are formed from particles having a diameter <50 μm.

In a first aspect there is provided a process for de-watering a sludge, comprising:

heating a de-watering fluid; and passing the de-watering fluid through the sludge, thereby de-watering the sludge.

In a second aspect there is provided a process for de-watering a sludge, the process comprising the step of contacting said sludge with a heated de-watering fluid, thereby de-watering the sludge.

The following options may be used in conjunction with the first or second aspect, either individually or in any combination.

In certain embodiments the de-watering fluid is passed through the sludge in the form of bubbles. In certain embodiments, passing the bubbles through the sludge causes evaporation of water of the sludge at an interface of the sludge and the bubbles so that the water of the evaporated sludge is contained within the bubbles as water vapour thereby de-watering the sludge. In certain specific embodiments the bubbles have an average diameter ranging from about 0.1 mm to about 7 mm.

In certain embodiments the de-watering fluid is heated so as to be at least 100° C., downstream of a location where the de-watering fluid is passed through the sludge.

In certain embodiments the sludge has a thickness of less than 20 cm in a direction extending parallel to a flow path of the de-watering fluid passing through the sludge.

In certain embodiments the sludge is flowed over a surface and a direction of the flow of sludge is transverse to a flow path of the de-watering fluid as the de-watering fluid passes through the sludge, the de-watering fluid being introduced into the sludge at an interface of the sludge and the surface.

In certain embodiments the process further comprises collecting water vapour after passing the de-watering fluid through the sludge and condensing the water vapour to form a water stream.

In certain embodiments the process further comprises further comprising collecting the de-watering fluid after passing it through the sludge, the collected de-watering fluid being passed back into sludge for de-watering said sludge. In certain specific embodiments condensing the water vapour to form the water stream separates the de-watering fluid from the water vapour so that the water stream and de-watering fluid can be separately collected.

In certain embodiments the process further comprises at least partially dehydrating the de-watering fluid prior to passing it through the sludge.

In certain embodiments the de-watering fluid is a gas. In certain specific embodiments the de-watering fluid is selected from the group consisting of air, $CO_2$, He, Ne, Ar, $N_2$, and mixtures thereof.

In certain embodiments sufficient de-watering fluid is passed into the sludge such that the fluidity of the sludge is increased so as to maintain the sludge in a fluid state when the sludge has a solids content that would result in the sludge acting as a solid in the absence of the de-watering fluid.

In certain embodiments a flowrate of the de-watering fluid is at least 0.1 L min$^{-1}$ cm$^{-2}$ of sludge surface.

In certain embodiments sufficient de-watering fluid is passed into the sludge such that a temperature of the sludge remains below 70° C. during the step of passing the de-watering fluid through the sludge.

In certain embodiments the process further comprises the step of converting the de-watering fluid to bubbles prior to passing the de-watering fluid through the sludge, or converting the de-watering fluid to bubbles and passing the bubbles of the de-watering fluid through the sludge simultaneously.

In an embodiment, the process comprises heating a de-watering fluid, converting the de-watering fluid to bubbles, and passing the bubbles of the de-watering fluid through the sludge. Passing the bubbles through the sludge may cause evaporation of water of the sludge at an interface of the sludge and the bubbles so that the water of the evaporated sludge is contained within the bubbles as water vapour, thereby de-watering the sludge.

In the case where the de-watering fluid is in the form of bubbles when passing through the sludge, the bubbles may have an average diameter ranging from about 0.1 mm to about 7 mm, about 0.1 mm to about 6 mm, about 0.1 mm to about 5 mm, about 1 mm to about 7 mm, about 1 mm to about 5 mm, about 2 mm to about 5 mm, or about 1 mm to about 3 mm. The bubbles may, for example, have an average diameter of about 0.1, 0.2, 0.5, 1, 2, 5, or 7 mm. In certain embodiments the bubbles may have an average diameter ranging from about 1 mm to about 3 mm. Without being bound by theory, it is thought that nanobubbles and submicron bubbles formed during, for example vibrations and shaking, may also act to de-water the sludge. These nanobubbles and submicron bubbles can contain water vapour and, when they collide with the bubbles that are formed from the de-watering fluid, the water vapour in the nanobubbles and submicron bubbles are released into the bubbles that are formed from the de-watering fluid. Thus, it should be understood that the reference to diameters of the bubbles herein is in relation to the bubbles formed from the de-watering fluid and not to nanobubbles and submicron bubbles. Further, the term "bubbles" as used herein is in relation to the bubbles formed from the de-watering fluid unless the context makes it clear otherwise.

In other embodiments, the inventors contemplate that the de-watering fluid may be established in a series or an array of streams of dewatering fluid in the sludge, and as the dewatering fluid is passed through the sludge, thereby dewatering the sludge. Other embodiments will be apparent to the skilled person.

The de-watering fluid may be heated sufficiently so as to be to at least 100° C. downstream of a location where the de-watering fluid is passed through the sludge, or at least about 110, 120, 130, 140, 150, 160, 170, 180, 190, or 200° C. downstream of a location where the de-watering fluid is passed through the sludge. It may, for example, be heated sufficiently so as to be about 100, 110, 120, 130, 140, 150, 160, 170, 180, 190, 200, 210, 220, or 250° C. downstream of a location where the de-watering fluid is passed through the sludge.

The de-watering fluid may be heated to a temperature of from about 100° C. to about 350° C., or from about 100° C. to about 300° C., about 100° C. to about 250° C., about 150° C. to about 250° C., about 150° C. to about 200° C., or about 200° C. to about 250° C. It may, for example be heated to a temperature of about 100, 110, 120, 150, 200, 210, 220, 230, 240, 250, 300, or 350° C.

The sludge to be dewatered may be arranged to have a thickness of less than about 50 cm, or less than about 40 cm, 30 cm, 25 cm, 20 cm, 15 cm, 10 cm, 5 cm, or 2 cm in a direction extending parallel to a flow path of the de-watering fluid (optionally in the form of bubbles) as the de-watering fluid passes through the so-arranged sludge. The sludge may be flowed over a surface and a direction of the flow of sludge can be transverse to a flow path of the de-watering fluid (optionally in the form of bubbles) as the de-watering fluid passes through the sludge. The de-watering fluid (optionally in the form of bubbles) may be introduced into the sludge at an interface of the sludge and the surface. The surface may comprise a porous sinter.

In the case where the de-watering fluid is in the form of bubbles when passing through the sludge, the process may further comprise collecting the water vapour after passing the bubbles through the sludge and condensing the water vapour to form a water stream. Such a step may help to recover and recycle any water used to form the sludge.

In the case where the de-watering fluid is in the form of bubbles when passing through the sludge, the he process may further comprise collecting the de-watering fluid after passing the bubbles through the sludge and converting the collected de-watering fluid into bubbles. This step may help to recycle the de-watering fluid. The de-watering fluid may be continually recycled. Condensing the water to form the water stream may separate the de-watering fluid from the water vapour so that the water stream and de-watering fluid can be separately collected.

In the case where the de-watering fluid is in the form of bubbles when passing through the sludge, the he process may further comprise at least partially dehydrating the de-watering fluid prior to forming the bubbles. For example, the de-watering fluid may be passed over dehydrating agents such as silica gel and molecular sieves prior to forming bubbles. Dehydrating the de-watering fluid may occur before heating the dehydrating fluid.

The de-watering fluid may be a gas that includes air such as atmospheric air, $CO_2$, He, Ne, Ar and/or $N_2$.

The de-watering fluid may act as a fluidising agent so as to maintain the sludge in a fluid state when the sludge has a solids content that would result in the sludge acting like a solid in the absence of the fluidising agent. In an embodiment, the de-watering fluid can act as a fluidising agent when a solids content of the sludge is at least 35%.

A flowrate of the de-watering fluid may be at least about 0.001 L/min per cm$^2$ of sludge surface (i.e. L min$^{-1}$ cm$^2$), or it may be at least about 0.002, 0.005, 0.01, 0.02, 0.05, 0.1, 0.2, 0.5, 1, 2, or 5 L min$^{-1}$ cm$^{-2}$ of sludge surface. In certain embodiments, a flowrate of the de-watering fluid may be up to about 0.1 L min$^{-1}$ cm$^{-2}$, or up to about 0.2, 0.5, 1, 2, 5, 10, or 20 L min$^{-1}$ cm$^{-2}$ of sludge surface. In an embodiment, the flowrate of the de-watering fluid may range from about 0.001 L min$^{-1}$ cm$^{-2}$ to about 20 L min$^{-1}$ cm$^{-2}$, or from about 0.01 L min$^{-1}$ cm$^{-2}$ to about 20 L min$^{-1}$ cm$^{-2}$, about 0.01 L min$^{-1}$ cm$^{-2}$ to about 10 L min$^{-1}$ cm$^{-2}$, about 0.01 L min$^{-1}$ cm$^{-2}$ to about 5 L min$^{-1}$ cm$^{-2}$, about 0.1 L min$^{-1}$ cm$^{-2}$ to about 1 L min$^{-1}$ cm$^{-2}$, or about 0.1 L min$^{-1}$ cm$^{-2}$ to about 0.4 L min$^{-1}$ cm$^{-2}$ of sludge surface. It may be, for example, about 0.001, 0.002, 0.005, 0.01, 0.02, 0.05, 0.1, 0.2, 0.5, 1, 2, 5, 10 or 20 L min$^{-1}$ cm$^{-2}$ of sludge surface.

In the case where the de-watering fluid is passed through a gas-permeable membrane before passing through the sludge, a flowrate of the de-watering fluid may be at least about 0.001 L/min per $cm^2$ of a surface of the membrane, optionally an upper surface of the membrane (i.e. L $min^{-1}$ $cm^{-2}$), or it may be at least about 0.002, 0.005, 0.01, 0.02, 0.05, 0.1, 0.2, 0.5, 1, 2, or 5 L $min^{-1}$ $cm^{-2}$ of a surface of the membrane. In certain embodiments, a flowrate of the de-watering fluid may be up to about 0.1 L $min^{-1}$ $cm^{-2}$, or up to about 0.2, 0.5, 1, 2, 5, 10, or 20 L $min^{-1}$ $cm^{-2}$ of a surface of the membrane. In an embodiment, the flowrate of the de-watering fluid may range from about 0.001 L $min^{-1}$ $cm^{-2}$ to about 20 L $min^{-1}$ $cm^{-2}$, or from about 0.01 L $min^{-1}$ $cm^{-2}$ to about 20 L $min^{-1}$ $cm^{-2}$, about 0.01 L $min^{-1}$ $cm^{-2}$ to about 10 L $min^{-1}$ $cm^{-2}$, about 0.01 L $min^{-1}$ $cm^{-2}$ to about 5 L $min^{-1}$ $cm^{-2}$, about 0.1 L $min^{-1}$ $cm^{-2}$ to about 1 L $min^{-1}$ $cm^{-2}$, or about 0.1 L $min^{-1}$ $cm^{-2}$ to about 0.4 L $min^{-1}$ $cm^{-2}$ of sludge surface. It may be, for example, about 0.001, 0.002, 0.005, 0.01, 0.02, 0.05, 0.1, 0.2, 0.5, 1, 2, 5, 10 or 20 L $min^{-1}$ $cm^{-2}$ of a surface of the membrane.

During the step of passing the de-watering fluid through the sludge, sufficient de-watering fluid may be passed into the sludge such that a temperature of the sludge may remain below about 100, 90, 80, 75, 70, 65, 60, 55, 50, or 45° C., for example, below about 65° C.

In certain embodiments, in the case where the de-watering fluid is in the form of bubbles when passing through the sludge, the steps of converting the de-watering fluid to bubbles and passing the bubbles of the de-watering fluid through the sludge may occur simultaneously.

An embodiment of the disclosed process may be used to treat low water content sludges, such as consolidated materials including nuclear waste. For example, the process disclosed herein may be used to treat sludges having a water content of below about 80, 70, 60, 50, 40, 30, 20, 10, or 5 wt %. An embodiment of the disclosed process may also be used in the production of materials, such as artificial opals.

In certain embodiments, the sludge may have an initial solids content (that is, the solids content of the sludge prior to being dewatered) of from about 5% (w/w) to about 80% (w/w), or from about 5% (w/w) to about 60% (w/w), about 5% (w/w) to about 40% (w/w), about 10% (w/w) to about 80% (w/w), about 20% (w/w) to about 80% (w/w), about 20% (w/w) to about 60% (w/w), or about 20% (w/w) to about 40% (w/w). The sludge may, for example, have an initial solids content of about 5, 10, 15, 20, 25, 30, 35, 40, 50, 60, 70, or 80% (w/w). In certain specific embodiments, the sludge may have a solids content of from about 20% (w/w) to about 40% (w/w) prior to being dewatered.

The process according to the present invention may be capable of dewatering sludge such that the percentage reduction in water content in the sludge after dewatering as compared with the sludge prior to dewatering may be from about 5% (w/w) to about 80% (w/w), or from about 5% (w/w) to about 60% (w/w), about 5% (w/w) to about 40% (w/w), about 10% (w/w) to about 80% (w/w), about 20% (w/w) to about 80% (w/w), about 20% (w/w) to about 60% (w/w), about 20% (w/w) to about 40% (w/w), or about 15% (w/w) to about 60% (w/w). The process may, for example, result in a percentage reduction in water content in the sludge of about 5, 10, 15, 20, 25, 30, 35, 40, 45 50, 55, 60, 65, 70, or 80% (w/w). It will be appreciated that the relative flow rate of fluid and sludge, and the temperature of the fluid may be adjusted in order to control the degree of dewatering. In certain embodiments the flow of the dewatering fluid may occur at a pressure at or close to atmospheric pressure.

In a third aspect there is provided a sludge that has been at least partially de-watered using the process according to the first or second aspect.

In a fourth aspect there is provided a system for de-watering sludge, comprising:
a de-watering fluid source capable of supplying a de-watering fluid;
a gas-permeable membrane in fluid communication with the de-watering fluid source, the gas-permeable membrane being capable of supporting the sludge at a surface of the gas-permeable membrane, such that passage of the de-watering fluid through the gas-permeable membrane enables the de-watering fluid to pass through the sludge; and
a heater in communication with the de-watering fluid source, the heater being configured to heat the de-watering fluid at an upstream side of the gas-permeable membrane.

The following options may be used in conjunction with the fourth aspect, either individually or in any combination.

In certain embodiments the system further comprises a condenser configured to condense water vapour into a water stream. In certain embodiments the system further comprises a recovery unit for recovering the de-watering fluid from the water vapour once the de-watering fluid has passed through the sludge, wherein the recovery unit allows the de-watering fluid to be recycled. In certain specific embodiments the recovery unit is the condenser.

In certain embodiments the gas-permeable membrane is arranged so that the sludge can flow across the surface of the gas-permeable membrane. In certain embodiments the gas-permeable membrane is inclined in a flow direction of the sludge. In certain specific embodiments the flow of sludge across the surface of the gas-permeable membrane is transverse to the flow of the de-watering fluid through the sludge.

In certain embodiments the system further comprises a temperature control unit in communication with the heater, the temperature control unit being operable to control a temperature of the de-watering fluid. In certain specific embodiments the temperature control unit includes a temperature sensor located upstream of the gas-permeable membrane and downstream of the heater.

In certain embodiments the de-watering fluid is a gas. In certain specific embodiments the de-watering fluid is selected from the group consisting of air, $CO_2$, He, Ne, Ar, $N_2$, and mixtures thereof.

In certain embodiments the system further comprises a dryer upstream of the gas-permeable membrane and in fluid communication with the de-watering fluid source, the dryer configured to at least partially dry the de-watering fluid.

In certain embodiments passage of the de-watering fluid through the gas-permeable membrane generates bubbles when the sludge is supported by the gas-permeable membrane.

In one embodiment, the system comprises a de-watering fluid and a gas-permeable membrane. The gas-permeable membrane may be in fluid communication with the de-watering fluid. The gas-permeable membrane may be capable of supporting the sludge at a surface of the gas-permeable membrane. Passage of the de-watering fluid through the gas-permeable membrane may generate bubbles when the sludge is supported by the gas-permeable membrane. The system may also comprise a heater in communication with the de-watering fluid. The heater may be configured to heat the de-watering fluid at an upstream side of the gas-permeable membrane.

The system may further comprise a condenser configured to condense the water vapour into a water stream.

The system may further comprise a recovery unit for recovering the de-watering fluid once the de-watering fluid has passed through the sludge (optionally in the form of bubbles). The recovery unit may allow the de-watering fluid to be recycled. In an embodiment, the recovery unit may be the condenser. For example, the water vapour may be entrained in the de-watering fluid and condensing the water vapour using the condenser can separate the water vapour from the de-watering fluid.

The gas-permeable membrane may be arranged so that the sludge can flow across the surface of the gas-permeable membrane. The gas-permeable membrane may be inclined in a flow direction of the sludge. The incline may slow the passage of sludge across the gas-permeable membrane which may help to increase the amount of time (i.e. treatment time) that the sludge takes to pass over the gas-permeable membrane. The system may be configured such that a flow of sludge across the surface of the gas-permeable membrane may be transverse to a de-watering fluid flow (optionally in the form of bubbles) through the sludge.

The system may further comprise a temperature control unit to control a temperature of the de-watering fluid. The temperature control unit may include a temperature sensor located upstream of the gas-permeable membrane and downstream of the heater.

The de-watering fluid may be a gas that includes air such as atmospheric air, $CO_2$, He, Ne, Ar and/or $N_2$.

The system may further comprise a dryer in fluid communication with the de-watering fluid. The dryer may be upstream of the gas-permeable membrane. The dryer may be configured to at least partially dry the de-watering fluid. Dehydrating the de-watering fluid may help to increase the amount of water vapour that can be contained in the bubbles. The dryer may comprise silica gel and/or molecular sieves.

The system of the fourth aspect may be used to perform the process according to the first or second aspect. The process of the first or second aspect may be performed using the system of the fourth aspect.

The system of the fourth aspect may be used to produce the sludge according to the third aspect. The sludge according to the third aspect may be produced using the system according to the fourth aspect.

Definitions

In describing and claiming the present invention, the following terminology will be used in accordance with the definitions set out below. It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Unless the context clearly requires otherwise, throughout the description and the claims, the terms "comprise", "comprising", and the like are to be construed in an inclusive sense as opposed to an exclusive or exhaustive sense; that is to say, in the sense of "including, but not limited to". For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, process or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where applicants have defined an invention or a portion thereof with an open-ended term such as "comprising", it should be readily understood that (unless otherwise stated) the description should be interpreted to also describe such an invention using the terms "consisting essentially of" or "consisting of." In other words, with respect to the terms "comprising", "consisting of", and "consisting essentially of", where one of these three terms is used herein, the presently disclosed and claimed subject matter may include the use of either of the other two terms. Thus, in some embodiments not otherwise explicitly recited, any instance of "comprising" may be replaced by "consisting of" or, alternatively, by "consisting essentially of".

Other than in the operating examples, or where otherwise indicated, all numbers expressing quantities of ingredients or reaction conditions used herein are to be understood as modified in all instances by the term "about". The examples are not intended to limit the scope of the invention. In what follows, or where otherwise indicated, "%" will mean "weight %", "ratio" will mean "weight ratio" and "parts" will mean "weight parts".

The terms "predominantly" and "substantially" as used herein shall mean comprising more than 50% by weight, unless otherwise indicated.

As used herein, with reference to numbers in a range of numerals, the terms "about," "approximately" and "substantially" are understood to refer to the range of −10% to +10% of the referenced number, preferably −5% to +5% of the referenced number, more preferably −1% to +1% of the referenced number, most preferably −0.1% to +0.1% of the referenced number. Moreover, with reference to numerical ranges, these terms should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, from 8 to 10, and so forth.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

BRIEF DESCRIPTION OF FIGURES

Embodiments of the disclosure will now be described by way of example only with reference to the following non-limiting Figures.

In FIG. 8 the helium flow rate is ⅓ that of air.

DETAILED DESCRIPTION OF EMBODIMENTS

Figure 1:
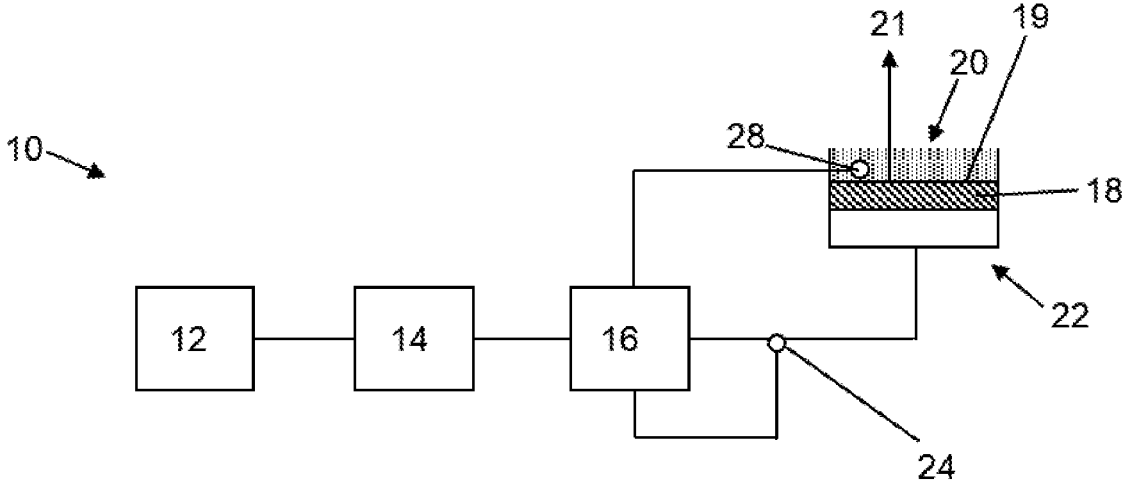
FIG. 1 shows an embodiment of a system of the disclosure.

FIG. 1 shows an embodiment of a system 10 that is used to de-water sludge. System 10 employs a de-watering fluid. In the embodiment shown in FIG. 1, the de-watering fluid is a gas. The gas is depicted in FIG. 1 as gas source 12. The gas in the gas source may be air such as atmospheric air, $CO_2$, He, Ne, Ar and/or $N_2$. A heater 16 is in fluid communication with the gas source 12. The heater 16 heats gas from the gas source 12 to a desired temperature. In an embodiment, the heater 16 is an electrically-controlled heater.

Positioned between the gas source 12 and the heater 16 is a dryer in the form of dehumidifier 14. Dehumidifier 14 acts to remove any moisture present in the gas that passes from the gas source 12 to the heater 16. The dehumidifier 14 can have drying agents such as silica gel, molecular sieves, and any other material that is capable of absorbing water. It should be noted that the dehumidifier 14 is not required in all embodiments. For example, gas can be passed directly from the gas source 12 to the heater 16, especially if the gas in the gas source 12 is already dry or dehumidified.

Downstream from the heater 16 is a manifold 22. The manifold 22 includes a gas-permeable membrane 18. The gas-permeable membrane 18 allows the heated gas to pass therethrough. In an embodiment, the gas-permeable membrane 18 has pores in the order of about 40 μm to about 100 μm. For example, the gas-permeable membrane 18 can be a sinter, such as a glass or stainless steel sinter, though it should be appreciated that the gas-permeable membrane 18 could be embodied in other forms.

In use of the system 10, sludge 20 is placed on top of the gas-permeable membrane 18. As heated gas passes through the gas-permeable membrane 18, the heated gas is converted at the membrane-sludge interface into bubbles of hot gas. The generation of bubbles occurs at an upper surface 19 of the gas-permeable membrane 18. In this way, the gas-permeable membrane 18 acts as a bubble generator when sludge 20 is in contact with the upper surface 19. Thus, the upper surface 19 of the gas-permeable membrane 18 acts as the interface between the sludge 20 and the gas-permeable membrane 18.

Once the bubbles are generated, the bubbles migrate upwards through the sludge 20. In FIG. 1 this migration of bubbles is represented by a flow path having a direction of arrow 21 (referred to herein as bubble flow 21). As the bubbles migrate through the sludge 20, evaporation of water of the sludge occurs at an interface of the sludge and the bubbles. The evaporated water is contained within the bubbles as water vapour thereby de-watering the sludge. In an embodiment, the generation of bubbles and de-watering of the sludge 20 occurs simultaneously.

Because the bubbles comprise heated gas, the heat of vaporization of the water is transferred into the bubbles in the form of water vapour rather than into the sludge 20. This means that the sludge 20 tends to remain at a temperature well below a temperature of the heated gas and bubbles. For example, a temperature of the heated gas may be greater than 150° C. but a temperature of the sludge may remain below about 70° C. It should be appreciated that gas(es) may be dissolved in the water of the sludge and that evaporation of the water of the sludge at the interface of the bubbles and the sludge also allows outgassing of the dissolved gasses into the bubbles. This means that, in addition to water vapour and the heated gas itself, the bubbles may also contain outgassed gas(es) from the water of the sludge. However, the volume of these gas(es) are typically insignificant compared to the volume of the bubbles formed from the gas of the gas source 12.

As the bubbles flow/migrate upwards through the sludge in the bubble flow 21, the bubbles eventually become saturated with water vapour. If the sludge 20 has a thickness in the direction of bubble flow 21 large enough, the bubbles become saturated before exiting the sludge 20. This has the potential to reduce the efficiency of the system 10. Therefore, in an embodiment, a thickness of the sludge 20 in a direction of the bubble flow 21 is controlled to have a maximum of 10 cm. In an embodiment, the sludge is controlled to have a thickness of 5 cm or less. It has been found that thicknesses in this range are optimal in terms of allowing a desirably high level of water vapour in the bubble approaching saturation with water vapour to be reached.

Once the bubbles pass through the sludge 20 the bubbles break apart, releasing the water vapour that was contained in the bubbles to the atmosphere above the sludge 20. To assist with describing the operation of the disclosed systems, once the bubbles break apart, the gas that is used to form the bubbles (from the gas source 12) and that is released from the bubbles will be referred to as "post-bubble gas". In system 10, the post-bubble gas is also released to the environment above the sludge 20 at the same time as water vapour.

A flow rate of the heated gas passing through the gas-permeable membrane 18 is determined from a variety of factors such as a temperature of the gas, a size of the bubbles, the type of gas in gas source 12, a thickness of the sludge 20, a viscosity of the sludge 20, a solids content of the sludge 20, a desired level of de-watering, and so on. In an embodiment, a flowrate of gas passing through the gas-permeable membrane 18 is at least 0.01 L min$^{-1}$ per cm$^2$ of an upper surface of the gas-permeable membrane. A flowrate of the gas may be up to about 1.0 L min$^{-1}$ cm$^{-2}$ of the membrane upper surface in certain embodiments. In an embodiment, the flowrate of the gas may range from about 0.10 L min$^{-1}$ cm$^{-2}$ of the membrane upper surface 19 to about 0.50 L min$^{-1}$ cm$^{-2}$ of the membrane upper surface. In an embodiment, the flowrate of the gas may range from about 0.1 L min$^{-1}$ cm$^{-2}$ to about 0.4 L min$^{-1}$ cm$^{-2}$ of an upper surface of the gas-permeable membrane. When air is used to form bubbles, a flow rate of air through the gas-permeable membrane 18 may be around 0.40 L min$^{-1}$ cm$^{-2}$-0.50 L min$^{-1}$ cm$^{-2}$ of an upper surface of the gas-permeable membrane. When helium is used to form bubbles, a flow rate of helium through the gas-permeable membrane 18 may be about 0.10 L min$^{-1}$ cm$^{-2}$-0.20 L min$^{-1}$ cm$^{-2}$ of an upper surface of the gas-permeable membrane. In an embodiment, the system 10 is fitted with a gas flowmeter or another detection means that can determine the flow rate of the gas.

Without being bound by theory, it is thought that helium atoms have a greater ability to disrupt hydrogen-bonding of water molecules at or close to an interface of the bubble and the sludge, which helps to increase the rate of vaporisation (evaporation) of water from the sludge 20 into the bubbles. This greater ability to disrupt hydrogen bonding means that a lower flow rate can be used, relative to gases such as air, to achieve a similar de-watering rate. However, the cost of helium compared with air means that, at least in some embodiments, air may be commercially more attractive even though helium may provide a better de-watering rate.

A flow rate of the gas and/or the gas-permeable membrane 18 may be selected to produce bubbles with specific diameters. In an embodiment, the bubbles have a diameter ranging from about 1 mm to about 3 mm. Bubbles having diameters less than 1 mm may be susceptible to slow passage through the sludge 20 due to the effects of Stokes' law. Additionally, it has been observed that the speed at which bubbles pass through the sludge 20 reaches a maximum with a diameter of about 3 mm, which means that increasing the diameter of the bubbles past 3 mm does not increase a speed at which the bubbles pass through the sludge 20. The result of this means that increasing a diameter of the bubbles past 3 mm reduces a surface area of the bubbles which may lead to decreased rates of de-watering. Although bubbles with a diameter of about 1 mm to about 3 mm may be desired in most embodiments, bubble diameters smaller than 1 mm or larger than 3 mm can still be used to de-water sludge using the disclosed systems and processes.

As shown in FIG. 1, the system 10 has temperature sensors 24 and 28. Temperature sensor 24 is positioned downstream of heater 16 and upstream of the gas-permeable membrane 18. The temperature sensor 24 measures a temperature of the heated gas prior to bubble formation. Temperature sensor 28 is positioned downstream of the gas-permeable membrane 18. Temperature sensor 28 measures a temperature of the sludge 20. The temperature sensors 24 and 28 are in communication with the heater 16 as shown. The heater 16 and temperature sensors 24 and 28 form part of a temperature control unit that functions to control a temperature of the heated gas. For example, if a temperature of the sludge 20 increases past a maximum threshold value, as determined by temperature sensor 28, the heater 16 can reduce the amount the gas is heated which causes a drop in a recorded temperature at temperature sensor 24. In an embodiment, a maximum threshold temperature of the sludge is about 70° C. As a further example, if a temperature of the gas as recorded at temperature sensor 24 is below a minimum threshold value, the heater 16 can heat the gas until a temperature of the gas, as determined by temperature sensor 24, rises to be at or within a predefined operating temperature or range. In an embodiment, the gas upstream of the gas-permeable membrane 18 is heated to a temperature ranging from about 100° C. to about 300° C. In another embodiment, the gas upstream of the gas-permeable membrane is heated above 300° C.

In an embodiment, the sludge 20 is formed from solids (i.e. particles) that are on average hydrophilic. The presence of hydrophilic particles helps to de-stabilise foaming in the absence of surfactants or polymers. If the sludge becomes overly hydrophobic, additives can be added to the sludge that render the hydrophobic particles more hydrophilic. For example, polymeric modifiers that bind to hydrophobic particles and that make the particles hydrophilic can be used.

Figure 2:
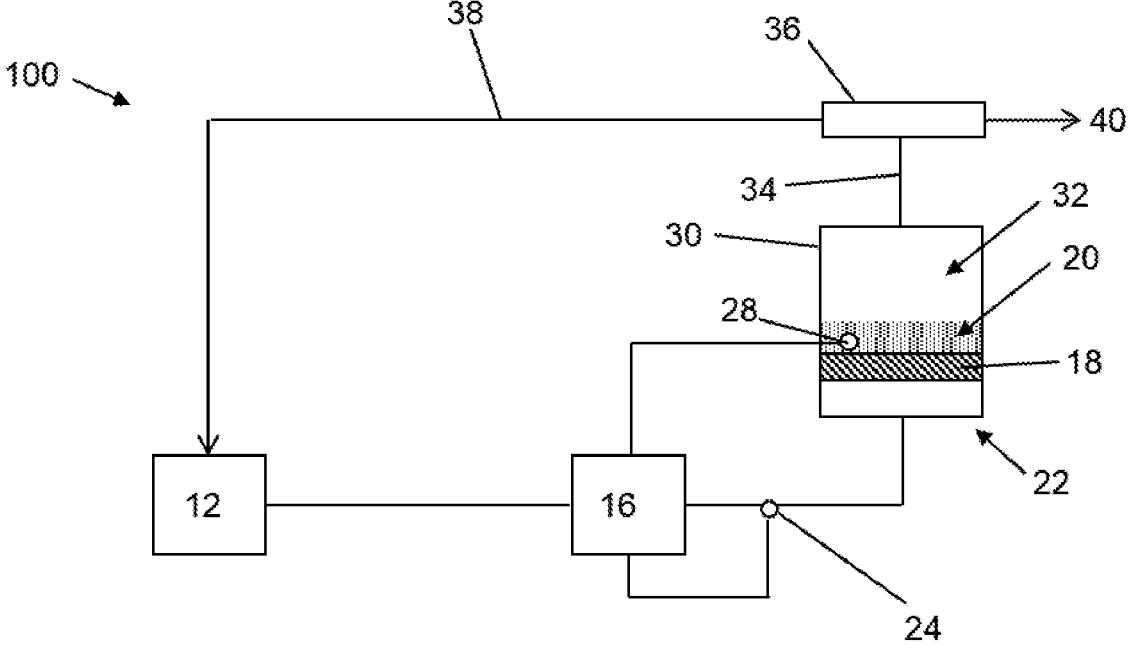
FIG. 2 shows another embodiment of a system of the disclosure.

FIG. 2 shows another embodiment of a system 100 used to de-water sludge. System 100 has a gas source 12, heater

16, manifold 22, gas-permeable membrane 18 and temperature sensors 24 and 28 similar to system 10. However, unlike system 10, system 100 is configured to collect and process the water vapour and post-bubble gas once the bubbles have passed through the sludge 20, rather than vent them directly to the atmosphere above the sludge 20. System 100 has a chamber 30 that sits above the manifold 22 and sludge 20. The chamber 30 defines an interior space 32 which traps water vapour and post-bubble gas once the bubbles have passed through the sludge 20. The chamber 30 directs the water vapour and post-bubble gas into conduit 34. In an embodiment the chamber 30 acts as a directional hood, for example to direct water vapour and post-bubble gas into conduit 34.

A recovery unit in the form of a separator 36 is in fluid communication with conduit 34 and is downstream of the chamber 30. Water vapour and post-bubble gas is passed from the interior space 32 into the separator 36 where the water vapour and post-bubble gas are separated from one another. As gas is continually passed through the sludge 20 in the form of bubbles, this flow of gas can transport the post-bubble gas and water vapour from the interior 32 into the separator 36. However, in an embodiment, an extractor, such as a fan or the like, is used to move post-bubble gas and water vapour from the interior space 32 into the separator 36.

The separator 36 has a first output stream in the form of water stream 40. An advantage of the disclosed processes and systems is that, unlike hydrocyclones which precipitate salts, the water vapour contained in the bubbles does not contain salts or other contaminants so, once condensed, forms a relatively pure water supply e.g. water stream 40. The water stream 40 can be collected and used elsewhere, for example upstream of de-watering during sludge or slurry formation in a processing plant.

The separator 36 also has a second output stream in the form of recycle gas stream 38. The recycle gas stream 38 is in fluid communication with the gas source 12 which allows post-bubble gas to be recombined in the gas source 12 and reused to form more bubbles. The use of the separator 36 and recycle gas stream 38 means that the amount of gas required to form bubbles to de-water the sludge 20 can be reduced. This may be advantageous for high cost gases such as helium. In an embodiment, the recycle gas stream 38 has a filter or scrubber (not shown) to remove any contaminants therein prior to being combined with the gas source 12.

In an embodiment, the separator 36 is integrated into the chamber 30 thereby omitting the need for conduit 34. The separator 36 can be a condenser. A condenser acts to condense the water vapour to generate water stream 40. As the atmosphere in the interior space 32 contains primarily post-bubble gas and water vapour, once the condenser has condensed the water vapour this only leaves post-bubble gas (plus any contaminant gases such as those that have degassed from the sludge 20).

In an embodiment, a condenser may be fitted to system 10 to generate a water steam but the condenser does not act to separate and isolate post-bubble gas to form a recycle gas stream. For example, when the gas source 12 is air, there may be no need to recycle the air but collecting and condensing the water vapour to form a water stream may be desirable.

Figure 3:
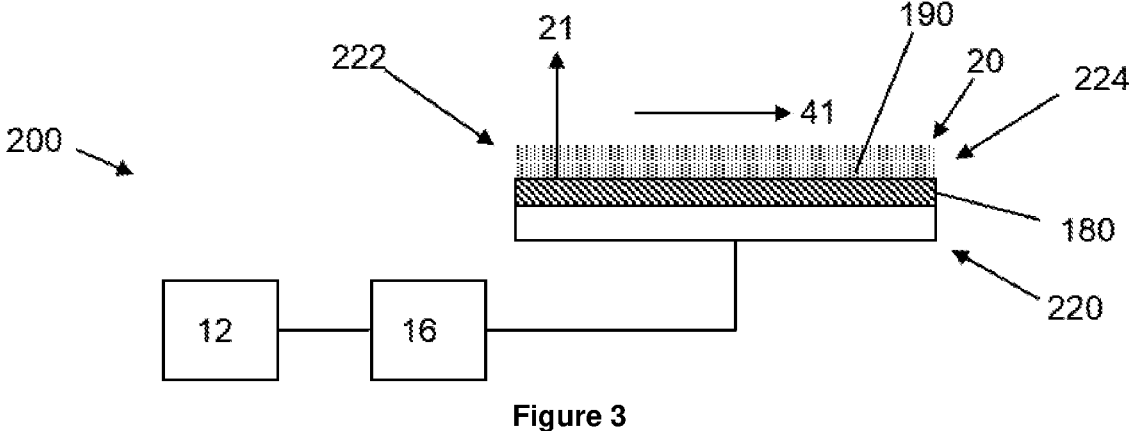
FIG. 3 shows another embodiment of a system of the disclosure.

When sludges have a solids content of more than about 35%, they generally act as a solid that does not flow. In these instances, a fluidising agent is required to allow the sludge to flow. The passage of the heated bubbles through the sludge in system 10 keeps the sludge 20 in a fluid state even if a solids content of the sludge increases past 35%. In this way, the gas from gas source 12, and in turn the bubbles, acts as a fluidising agent. The fact that the gas from the gas source 12 can act as a fluidising agent can be used to de-water sludge over a wider range of conditions. As best shown in FIG. 3, system 200 makes use of the fact the gas from gas source 12 acts as a fluidising agent. System 200 is similar to system 10, except with the omission of the optional dehumidifier 14. The manifold 220 and gas-permeable membrane 180 in system 200 are elongate and are arranged to allow the sludge 20 to flow over the upper surface 190 of the gas-permeable membrane 180.

As shown in FIG. 3, the sludge flows across the gas-permeable membrane 180 in a direction depicted by arrow 41 (referred to herein as sludge flow 41). The direction of the sludge flow 41 is transverse to the bubble flow 21 from manifold 220 through the sludge 20. In the embodiment shown in FIG. 3, sludge first contacts the gas-permeable membrane 180 at an entry side 222 of the membrane and travels across the upper surface 190 towards an exit side 224 of the gas-permeable membrane 180. The time that the sludge 20 is de-watered using the bubbles (i.e. the treatment time) increases as the sludge 20 moves from the entry 222 to the exit 224. Accordingly, as the sludge 20 travels across the gas-permeable membrane 180 from the entry 222 to the exit 224, a solids content of the sludge 20 increases and is higher at the exit 224 compared to the entry 222 as a result of an increased amount of de-watering as the sludge moves in the direction of sludge flow 41.

During movement of the sludge 20 from the entry 222 to the exit 224, a solids content of the sludge 20 may increase past a predefined solids content whereby, in the absence of a fluidising agent, the sludge 20 forms a solid, or non-fluid, material. This predefined solids content, where the sludge goes from acting as a fluid to a solid, is 35% for some types of sludge. However, the passage of bubbles from the upper surface 190 through the sludge 20 keeps the sludge 20 in a fluid state even if a solids content of the sludge exceeds the predefined solids content. This means that the bubbles advantageously act as a fluidising agent to maintain the sludge 20 in a fluid state rather than acting as a solid.

Figure 4:
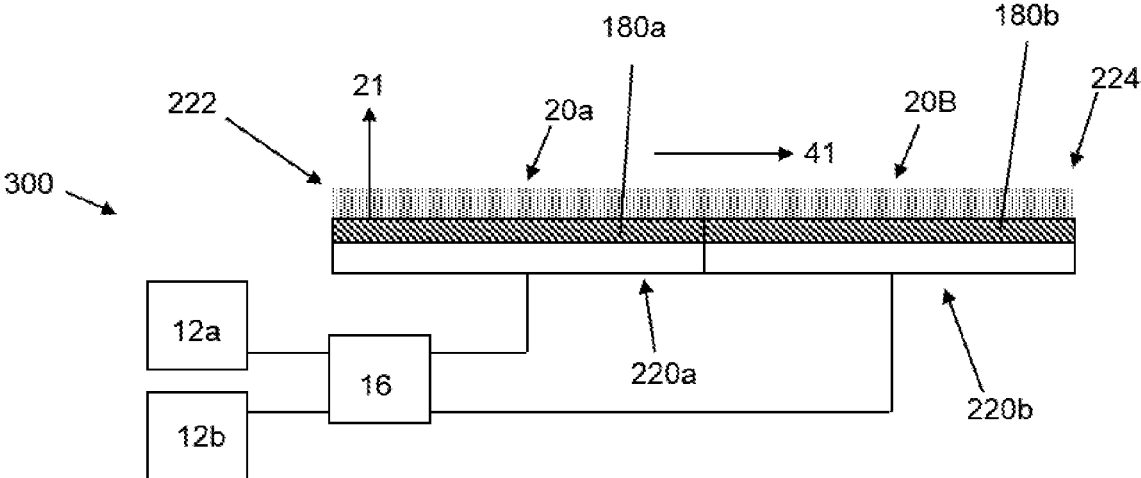
FIG. 4 shows another embodiment of a system of the disclosure.

The manifold 220 can have different zones to produce different bubble zones. For example, as best shown in FIG. 4, a system 300 has a number of zones in the form of first manifold zone 220a and second manifold zone 220b. Each manifold zone 220a and 220b includes a respective gas-permeable membrane 180a and 180b. Sludge first contacts the gas-permeable membrane 180a at entry 222. As the sludge 20a is treated with bubbles in the first manifold zone 220a it moves towards the exit 224 and onto gas-permeable membrane 180b where the sludge 20b is treated with bubbles in the second manifold zone 220b before reaching the exit 224.

As shown in FIG. 4, the first manifold zone 220a is in fluid communication with a first gas source 12a and the second manifold zone 220b is in fluid communication with a second gas source 12b. The first and second gas sources 12a and 12b may be the same gas or different gases. By providing each manifold zone 220a and 220b with its own gas source, the treatment conditions, such as gas flow rate and gas temperature, can be independently controlled. The conduits connecting the first and second gas sources 12a and 12b to their respective manifold 220a and 220b are shown as passing through a single heater 16. However, in an embodiment, each conduit connecting the gas source 12 to the respective manifold 220 can have its own heater.

Each manifold zone 220a and 220b can have different treatment conditions. For example, the first manifold zone 220a can have bubbles formed from a first gas at a first temperature and the second manifold zone 220b can have bubbles formed from a second gas at a second temperature. The use of different treatment conditions may help to more efficiently de-water the sludge 20. For example, helium has shown to be more efficient at de-watering sludge, but it is an expensive gas. By having two treatment conditions, helium gas can be selectively used for example in a pre-conditioning step or in a polishing step. Having different treatment conditions may also allow the use of less expensive gases, such as air, as the gas for sections of sludge 20 that require a fluidising agent in addition to de-watering.

Systems 200 and 300 are shown as having a generally horizontal upper surface 190. However, in an embodiment, the gas-permeable membrane 180, and thus the upper surface 190, are inclined for example in a direction of sludge flow 41. The bubble flow 21 through the sludge 20 may be adjusted relative to a plane of the upper surface 190 to assist in the movement of the sludge 20 across the gas-permeable membrane. For example, the bubble flow 21 may define an acute angle relative to a plane of the upper surface 190. In an embodiment, the bubble flow 21 is vertical.

Although not shown in FIGS. 2-4, a dehumidifier can optionally be used in system 100, 200 and/or 300 similar to that used in system 10. Further, the embodiments depicted in the Figures have the heater 16 being separate to the manifold 22, but in another embodiment the heater 16 is integrated into the manifold 22. More than one heater may be used to heat the gas. The separator 36 or condenser can optionally be used in systems 200 and 300, such as to recycle gas and/or produce a water stream.

The disclosed process may also be used to form materials. For example, controlled dewatering of silica particles in the size range of about 150 nm to 300 nm using an embodiment of the system and/or method disclosed herein may produce a synthetic opal with visible opalescent properties. In an embodiment, synthetic opals may be made much more quickly than by existing means.

Examples

Embodiments will now be described with reference to the following non-limiting Examples.

Materials and Methods

For each experiment, 50 g of silica powder (5 $\mu$m spherical particles, supplied by US Research Nanomaterials, Inc) was mixed with 200 g of MilliQ water to form a silica sludge. The silica sludge was stirred to produce a uniform dispersion. The measured turbidity of prepared silica sludges with a solids content of 20% wt had a turbidity of 40,000 NTU (using a HACH 2100AN Turbidimeter instrument). The prepared silica sludges were added to a bubble column employing air, and then helium, at either 150° C. or 250° C.

250 mL of the silica sludge was poured onto a 40-100 micron pore-size glass sinter with a 120 mm diameter in an open-top glass column (Büchner type, Pyrex® Borosilicate, VWR). This glass sinter has a surface area of 113 cm². An inlet gas temperature into the glass column was varied using a Tempco air heater (300 W) with a thermocouple temperature monitor and an AC Variac electrical supply.

The actual temperature of the dry gas downstream of the sinter was measured at the centre of the sinter by a Tenmars thermometer (±1.5° C.) without any silica sludge in the column. The air gas was produced from an air pump (Hiblow HP40, Philippines) and a BOC gas flow meter was used to measure flow rates. The temperature of the silica sludge in the column was also continuously monitored using a thermocouple positioned at the centre of the column solution. A gas at temperatures of 300-600° C. upstream of the glass sinter was needed to produce gas temperatures just downstream of the glass sinter up to 250° C. prior to the application of sludge to the sinter, and this necessitated the use of steel and brass connectors and FM Insulation Rock Wool as an insulating material downstream from the output from the heater. The efficiency of the de-watering process was measured experimentally based on the weight loss of the silica sludge in the de-watering process.

Results and Discussion

Results for Air

The de-watering efficiency of the example process using hot dry inlet air at 150° C. (downstream of the glass sinter in the absence of silica sludge) and with a flow rate of 34 L min⁻¹ for a sinter having a surface area of 113 cm², went from a starting solids content of 20% to a treated solids content of 30.5% after a period of 45 mins. The density of the silica sludge increased from 1.05 g/mL to 1.16 g/mL after de-watering. The operating temperature of the silica sludge during de-watering remained at about 48-49° C.

Figure 5:
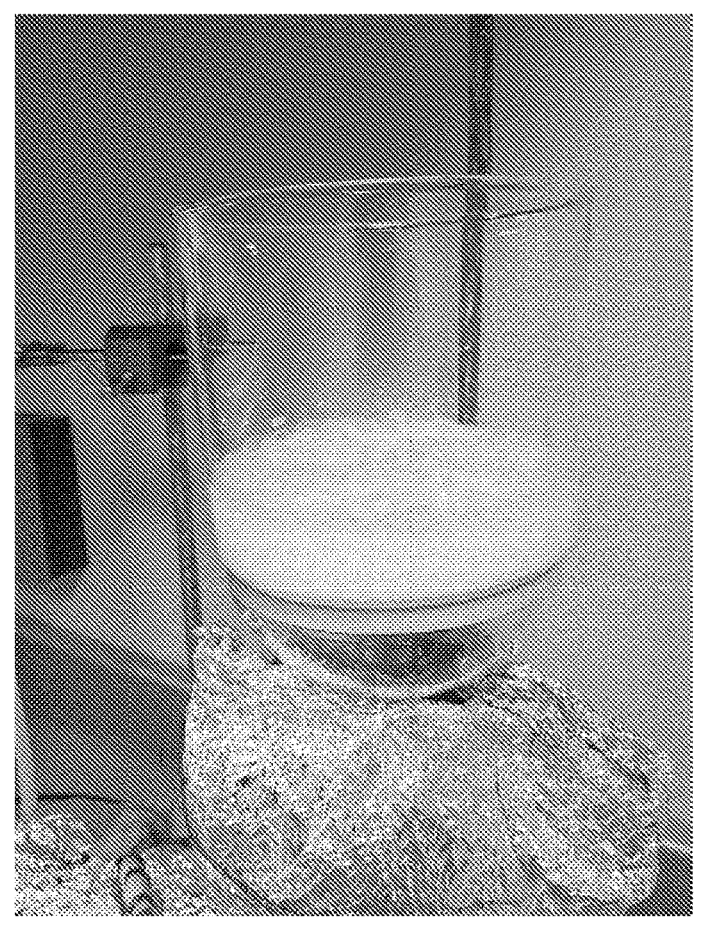
FIG. 5 shows a photograph of de-watering of a silica sludge using an embodiment of the disclosed process.

For a dry air inlet of 250° C. (downstream of the glass sinter in the absence of silica sludge) with a flow rate of 34 L min⁻¹ over 45 min for a sinter having a surface area of 113 cm², the silica sludge remained at about 65° C.-66° C. during de-watering, the silica concentration increased from 20% to 34.7%, and the density went from 1.05 g/mL to 1.25 g/mL after de-watering. An example of the bubbling process is shown in the photograph in FIG. 5.

Results for Helium

When helium gas was used to produce bubbles, the helium flow rates were measured using two methods: by weighing the helium cylinder and from calculations based on the helium cylinder pressure differential. For a sinter having a surface area of 113 cm², the first method gave a flow rate of about 13.9 L min⁻¹ and the second 10.4 L min⁻¹, so an average value of 12 L min⁻¹ was used for comparison with the air flow rate of 34 L min⁻¹. Helium was shown to be a more effective gas in bubbling because of its natural production of smaller bubbles, even in pure water. In practice this meant that for helium lower flow rates could be used to de-water sludge compared to other gases such as air to achieve the same level of de-watering.

In these initial experiments, helium was bubbled into the column having a sinter having a surface area of 113 cm² and containing silica sludge with a solids content of 20% at an inlet temperature of 150° C. (downstream of the glass sinter in the absence of silica sludge) with a flow rate of 12 L min⁻¹. After 45 min, the silica sludge equilibrated at a temperature of about 41° C., the silica concentration was increased to 28% and the solution density increased from 1.05 g/ml to 1.19 g/ml. When the helium inlet gas temperature was increased to 250° C. (downstream of the glass sinter in the absence of silica sludge) at 12 L min⁻¹, after 45 min the column solution equilibrated at about 63° C., the solids content was increased to 32.5% and the solution density increased from 1.05 g/ml to 1.23 g/ml. Table 1 summarises the de-watering results of silica sludges with a solids content of 20% using the example process and using air or helium gas as the de-watering fluid.

TABLE 1

| De-watering of silica sludges with an initial solids content of 20% and density of 1.05 g/mL using either air or helium as the de-watering fluid through a sinter having a surface area of 113 cm². | | | | |
|---|---|---|---|---|
| Gas Flow Rate (L min⁻¹) | Gas inlet Temperature* (° C.) | Column Solution Temperature (° C.) | Sludge Thickening (%) | Sludge Density (g/mL) |
| Bubble column evaporator (BCE) with air | 34 | 150 | 48-49 | 30.5 | 1.16 |
| | 34 | 250 | 65-66 | 34.7 | 1.25 |
| BCE with He | 12 | 150 | 41 | 28.0 | 1.19 |
| | 12 | 250 | 63 | 32.5 | 1.23 |

*Downstream of the glass sinter in the absence of silica sludge.

Figure 6:
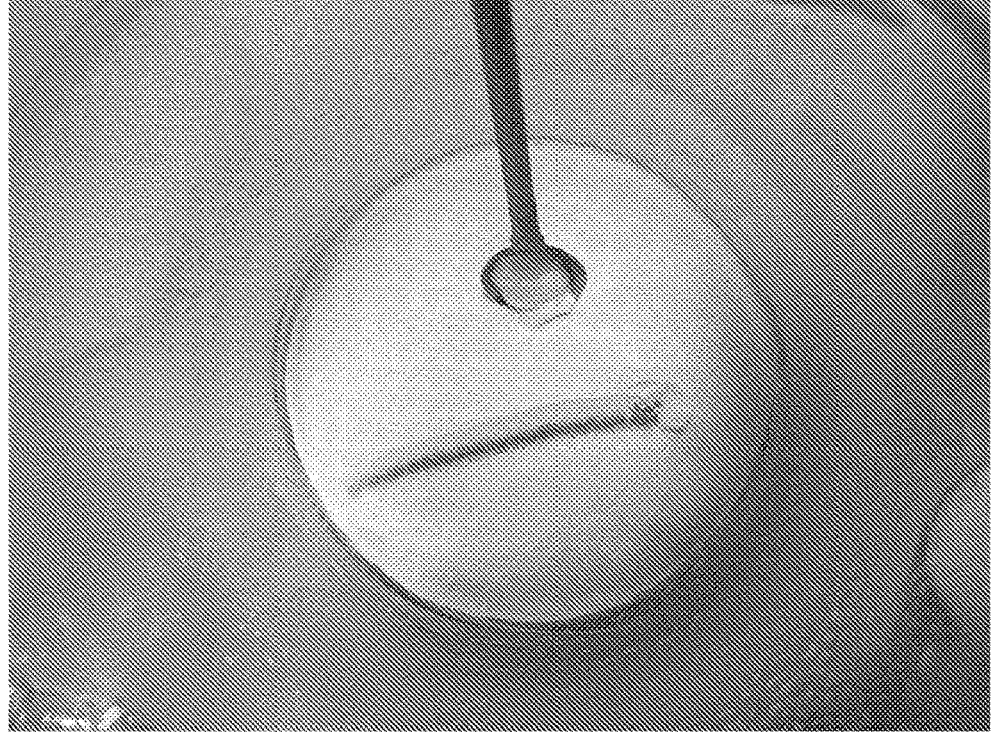
FIG. 6 shows solidification of the silica sludge of FIG. 5 upon removal of de-watering fluid.

At these high silica content levels (i.e. >30%) the dispersion remained sufficiently fluid for reasonable transport during generation of bubbles, but on removing the hot inlet gas flow and the cessation of bubble formation the dispersion immediately solidified as shown in the photograph in FIG. 6.

Figure 7:
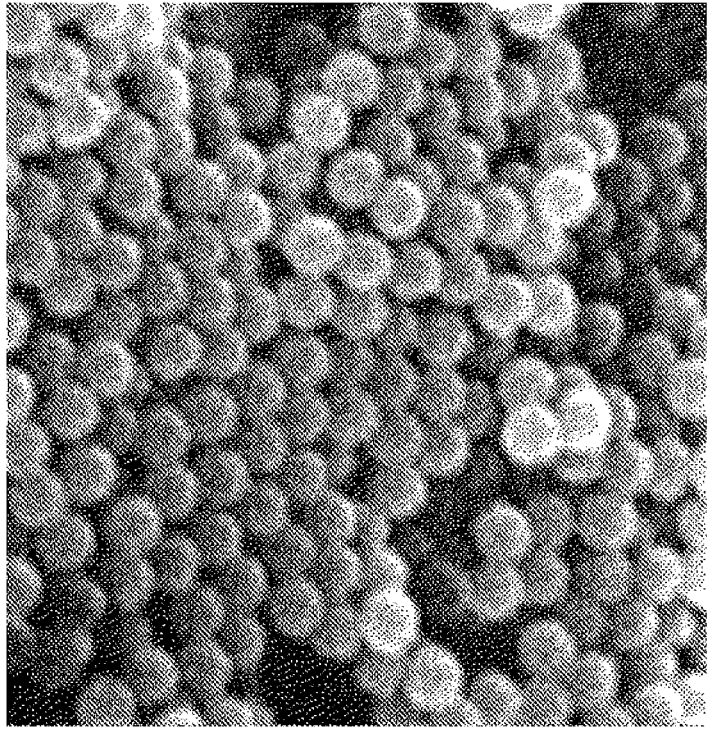
FIG. 7 shows a scanning electron micrograph of micro-silica spheres of the sludge of FIGS. 5 and 6.

FIG. 7 shows a Scanning Electron Microscopy (SEM) image of precipitated silica particles from an embodiment of the disclosure, which shows that they are spherical in appearance, monodisperse and very fine.

Fine particles (e.g., silica spheres) can stabilise aqueous foams, such as foams formed in sludge, even in the absence of surfactants or polymers. Aqueous foams can be stabilised solely by particles, but aqueous particles are usually partially hydrophobic and so have an amphiphilic nature. The examples are based on the use of hydrophilic silica particles dispersed in pure water. These micron sized particles would generally act to destabilise foams via water film rupture and hence, even with continuous air or helium gas flow, no significant level of even transient foaming was observed (for example, see FIG. 5).

Figure 8:
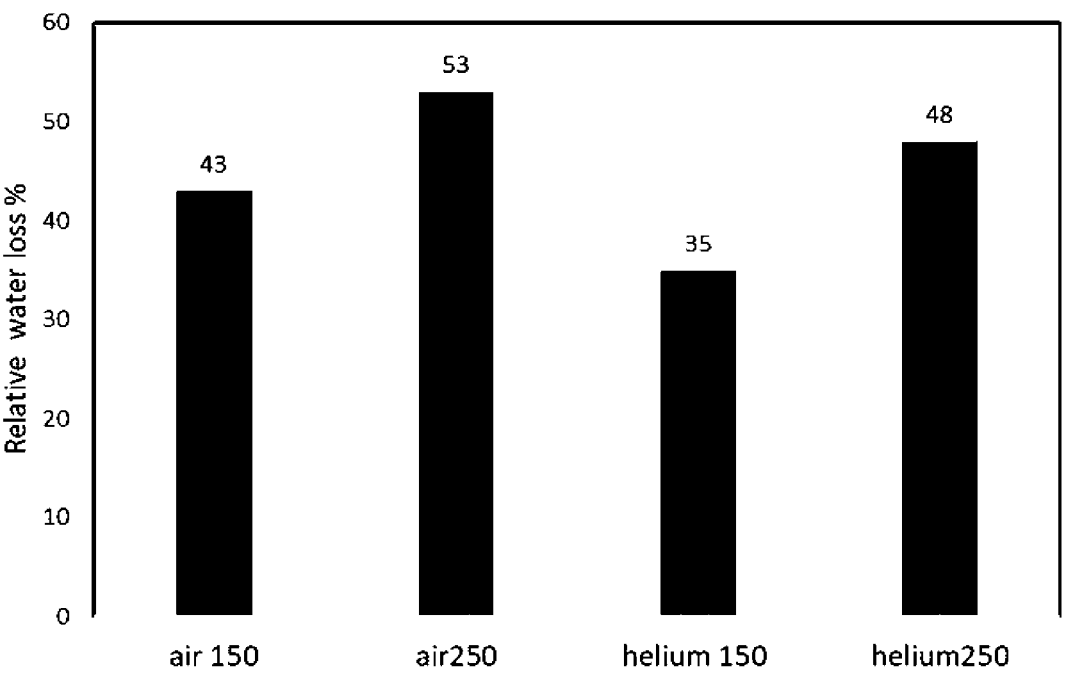
FIG. 8 shows a graph of a comparison of the water removal rates for air vs helium at 150° C. and 250° C.

The relative water loss under different conditions is summarised in FIG. 8. The flow rate of the helium in FIG. 8 was only a third of the flow rate for air, which shows that helium gas is much more effective at de-watering sludges compared with air.

It will be understood to persons skilled in the art of the disclosure that many modifications may be made without departing from the spirit and scope of the disclosure.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

Disclosed herein are the following embodiments:

1. A process for de-watering a sludge, comprising:
   heating a de-watering fluid;
   converting the de-watering fluid to bubbles; and
   passing the bubbles of the de-watering fluid through the sludge,
   wherein passing the bubbles through the sludge causes evaporation of water of the sludge at an interface of the sludge and the bubbles so that the water of the evaporated sludge is contained within the bubbles as water vapour thereby de-watering the sludge.

2. The process of embodiment 1, wherein the bubbles have a diameter ranging from about 0.1 mm to about 7 mm.

3. The process of embodiment 1 or 2, wherein the de-watering fluid is heated so as to be at least 100° C., downstream of a location where the de-watering fluid is converted to the bubbles and where the sludge is to be de-watered.

4. The process of any one of embodiments 1 to 3, wherein the sludge has a thickness of less than 20 cm in a direction extending parallel to a flow path of the bubbles passing through the sludge.

5. The process of any one of embodiments 1 to 4, wherein the sludge is flowed over a surface and a direction of the flow of sludge is transverse to a flow path of the bubbles as the bubbles pass through the sludge, the bubbles being introduced into the sludge at an interface of the sludge and the surface.

6. The process of any one of embodiments 1 to 5, further comprising collecting the water vapour after passing the bubbles through the sludge and condensing the water vapour to form a water stream.

7. The process of any one of embodiments 1 to 6, further comprising collecting the de-watering fluid after passing the bubbles through the sludge, the collected de-watering fluid being converted back into bubbles.

8. The process of embodiment 7 when dependent on embodiment 6, wherein condensing the water vapour to form the water stream separates the de-watering fluid from the water vapour so that the water stream and de-water fluid can be separately collected.

9. The process of any one of embodiments 1 to 8, further comprising at least partially dehydrating the de-watering fluid prior to forming the bubbles.

10. The process of any one of embodiments 1 to 9, wherein the de-watering fluid is a gas that includes air, $CO_2$, He, Ne, Ar and/or $N_2$.

11. The process of any one of embodiments 1 to 10, wherein the de-watering fluid acts as a fluidising agent so as to maintain the sludge in a fluid state when the sludge has a solids content that would result in the sludge acting as a solid in the absence of the fluidising agent.

12. The process of any one of embodiments 1 to 11, wherein a flowrate of the de-watering fluid is at least $0.1 \, \text{L min}^{-1} \, \text{cm}^{-2}$ of sludge surface.

13. The process of any one of embodiments 1 to 12, the process being operated such that a temperature of the sludge remains below 70° C. during the step of passing the bubbles through the sludge.

14. The process of any one of embodiments 1 to 13, wherein the steps of converting the de-watering fluid to bubbles and passing the bubbles of the de-watering fluid through the sludge occurs simultaneously.

15. Sludge that has been at least partially de-watered using the process of any one of embodiments 1 to 14.

16. A system for de-watering sludge, comprising:
   a de-watering fluid;
   a gas-permeable membrane in fluid communication with the de-watering fluid, the gas-permeable membrane being capable of supporting the sludge at a surface of the gas-permeable membrane, wherein passage of the de-watering fluid through the gas-permeable membrane generates bubbles when the sludge is supported by the gas-permeable membrane; and a heater in communication with the de-watering fluid, the heater being configured to heat the de-watering fluid at an upstream side of the gas-permeable membrane.

17. The system of embodiment 16, further comprising a condenser configured to condense the water vapour into a water stream.

18. The system of embodiment 16 or 17, further comprising a recovery unit for recovering the de-watering fluid from the water vapour once the bubbles have been passed through the sludge, wherein the recovery unit allows the de-watering fluid to be recycled.

19. The system of embodiment 18 when dependent on embodiment 17, wherein the recovery unit is the condenser.

20. The system of any one of embodiments 16 to 19, wherein the gas-permeable membrane is arranged so that the sludge can flow across the surface of the gas-permeable membrane.

21. The system of embodiment 20, wherein the gas-permeable membrane is inclined in a flow direction of the sludge.

22. The system of embodiment 20 or 21, wherein the flow of sludge across the surface of the gas-permeable membrane is transverse to a bubble flow through the sludge.

23. The system of any one of embodiments 16 to 22, further comprising a temperature control unit in communication with the heater, the temperature control unit being operable to control a temperature of the de-watering fluid.

24. The system of embodiment 23, wherein the temperature control unit includes a temperature sensor located upstream of the gas-permeable membrane and downstream of the heater.

25. The system of any one of embodiments 16 to 24, wherein the de-watering fluid is a gas that includes air, $CO_2$, He, Ne, Ar and/or $N_2$.

26. The system of any one of embodiments 16 to 25, further comprising a dryer upstream of the gas-permeable membrane and in fluid communication with the de-watering fluid, the dryer configured to at least partially dry the de-watering fluid.

Although the invention has been described with reference to specific examples, it will be appreciated by those skilled in the art that the invention may be embodied in many other forms in particular features of any one of the various described examples may be provided in any combination in any of the other described examples. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A process for de-watering sludge, comprising:
   heating a gas to a temperature of from 100° C. to 350° C.; and
      passing the heated gas through a gas-permeable membrane supporting sludge at a surface thereof, causing bubbles of hot gas to form at an interface between the surface of the gas-permeable membrane and the sludge; and
   passing the bubbles of hot gas through the sludge, thereby de-watering the sludge.

2. The process of claim 1, wherein said passing of the bubbles of hot gas through the sludge causes evaporation of water of the sludge at an interface of the sludge and the gas bubbles so that the water of the evaporated sludge is contained within the gas bubbles as water vapour thereby de-watering the sludge.

3. The process of claim 1, wherein the bubbles have an average diameter ranging from about 0.1 mm to about 7 mm.

4. The process of claim 1, wherein the sludge has a thickness of less than 20 cm in a direction extending parallel to a flow path of the heated gas passing through the sludge.

5. The process of claim 1, wherein the sludge is flowed over the surface of the gas-permeable membrane and a direction of the flow of sludge is transverse to the flow path of the heated gas passing through the sludge.

6. The process of claim 1, further comprising collecting water vapour after passing the heated gas through the sludge and condensing the water vapour to form a water stream, wherein condensing the water vapour to form the water stream separates the heated gas from the water vapour so that the water stream and heated gas can be separately collected.

7. The process of claim 1, wherein the gas is selected from the group consisting of air, $CO_2$, He, Ne, Ar, $N_2$, and mixtures thereof.

8. The process of claim 1, wherein sufficient heated gas is passed into the sludge such that the: (i) fluidity of the sludge is increased so as to maintain the sludge in a fluid state when the sludge has a solids content that would result in the sludge acting as a solid in the absence of the heated gas; and/or (ii) a temperature of the sludge remains below 70° C. during the step of passing the heated gas through the sludge.

9. A system for de-watering sludge, comprising:

a source of gas capable of supplying a gas;

a gas-permeable membrane in fluid communication with the source of gas, the gas-permeable membrane being capable of supporting sludge at a surface of the gas-permeable membrane; and a heater in communication with the source of gas, the heater being configured to heat the gas to a temperature of from 100° C. to 350° C. at an upstream side of the gas-permeable membrane, causing bubbles of hot gas to form at an interface between the surface of the gas-permeable membrane and the sludge, wherein passage of the bubbles of hot gas through the sludge enables de-watering of the sludge.

10. The system of claim 9, further comprising a condenser configured to condense water vapour into a water stream.

11. The system of claim 10, further comprising a recovery unit for recovering the heated gas from the water vapour once the heated gas has passed through the sludge, wherein the recovery unit allows the heated gas to be recycled, wherein the recovery unit is the condenser.

12. The system of claim 9, wherein the gas-permeable membrane is arranged so that the sludge can flow across the surface of the gas-permeable membrane, wherein the flow of sludge across the surface of the gas-permeable membrane is transverse to the flow of heated gas passing through the sludge.

13. The system of claim 9, further comprising a temperature control unit in communication with the heater, the temperature control unit being operable to control a temperature of the gas, wherein the temperature control unit includes a temperature sensor located upstream of the gas-permeable membrane and downstream of the heater.

14. The system of claim 9, wherein the gas is selected from the group consisting of air, $CO_2$, He, Ne, Ar, $N_2$, and mixtures thereof.

15. The system of claim 9, further comprising a dryer upstream of the gas-permeable membrane and in fluid communication with the source of gas, the dryer configured to at least partially dry the gas.

16. The system of claim 9, wherein passage of heated gas-through the gas-permeable membrane generates bubbles when the sludge is supported by the gas-permeable membrane.

\* \* \* \* \*